(12) United States Patent
Takaki et al.

(10) Patent No.: US 6,444,353 B1
(45) Date of Patent: Sep. 3, 2002

(54) INTEGRATED SEALED SECONDARY BATTERY

(75) Inventors: Mitsugu Takaki, Toyohashi (JP); Shinsuke Fukuda, Toyohashi (JP); Shinichi Yuasa, Kyotanabe (JP); Shinji Hamada, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/516,558

(22) Filed: Feb. 29, 2000

(30) Foreign Application Priority Data

| Mar. 3, 1999 | (JP) | 11-055611 |
| Mar. 3, 1999 | (JP) | 11-055613 |
| Mar. 3, 1999 | (JP) | 11-055615 |

(51) Int. Cl.[7] .............................................. H01M 10/50
(52) U.S. Cl. .......................... 429/120; 429/88; 429/148
(58) Field of Search ..................... 429/120, 83, 87, 429/88, 148

(56) References Cited

U.S. PATENT DOCUMENTS

| 1,152,247 | A | * | 8/1915 | Walker |
| 4,107,402 | A | * | 8/1978 | Dougherty et al. .......... 429/120 |
| 5,456,994 | A | * | 10/1995 | Mita ....................... 429/120 X |
| 5,639,571 | A | * | 6/1997 | Waters et al. ............ 429/120 X |
| 5,641,589 | A | * | 6/1997 | Grivel et al. ................ 429/120 |
| 5,985,483 | A | * | 11/1999 | Verhoog et al. ............. 429/120 |

FOREIGN PATENT DOCUMENTS

| EP | 644604 | 3/1995 |
| JP | 61-45571 | 3/1986 |
| JP | 6-215804 | 8/1994 |
| JP | 7-85847 | 3/1995 |

* cited by examiner

Primary Examiner—John S. Maples
(74) Attorney, Agent, or Firm—Jordan and Hamburg LLP

(57) ABSTRACT

An integrated sealed secondary battery in which a plurality of cells are arranged in a row, cooling medium passages are formed on both sides on the row of the cell, and cooling medium passages are formed between adjacent cells such as to effect communication between the cooling medium passages on both sides.

16 Claims, 14 Drawing Sheets

INTEGRATED SEALED SECONDARY BATTERY

BACKGROUND OF THE INVENTION

1. Technical Field

The present invention relates to an integrated sealed secondary battery wherein a plurality of cells are arranged in series, thereby forming a one-piece battery housing.

2. Description of Related Art

FIG. 14 shows a known integrated sealed secondary battery of this type disclosed in Laid-open Japanese Patent Publication No. 7-85847. Electricity-generating elements are accommodated respectively in cases 63 formed in rectangular tubular shape having a bottom, and the apertures of the cases 63 are sealed by covers 64, thereby constituting cells 62. A plurality of these cells 2 are arranged in a row, and the cases 63 of these cells 62 are tightly bound together with end plates 65 and restraining bands 66. Positive electrode terminals 67 and negative electrode terminals 68 of cells 62 pass through the covers 64, projecting upwardly, and these terminals 67, 68 are connected successively in series by electrical connection bars 69.

The mono-block rechargeable battery disclosed in Laid-open Japanese Patent Publication No. 6-215804 in which a battery housing 71 and a cover 72 made of plastics material are heat-welded is constructed as shown in FIG. 15. Side plates 73 having concave spaces on the inside thereof are heat-welded to the outside faces of opposite side walls of two battery housings 71, whereby a water-cooled jacket 74 is formed between the side walls of the battery housings 71 and the side plates 73. A cooling liquid inlet orifice 75 for supplying cooling liquid to the water-cooled jacket 74 and an outlet orifice (not shown) for discharging cooling liquid are provided at both ends of the cover 72. Numeral 76 represents a connecting trough protruding above the side plate 73 such as to communicate the orifice 75 in the cover 72 with the interior of the water-cooled jacket 74. It is further disclosed that an inlet orifice and outlet orifice are provided above the two ends of side plate 73.

Laid-open Japanese Patent Publication No. 61-45571 discloses the provision of cooling passages that pass through upper and lower portions of partitions between cells in a mono-block housing, and the provision of cooling medium inlet/evacuation headers thereabove and therebelow, separate covers being provided for each cell.

However, with the integrated sealed secondary battery of Laid-open Japanese Patent Publication No. 7-85847, since the cells are tightly bound in close contact, if the ambient temperature is high or if discharge is effected with large current, heat cannot be removed sufficiently from the cells. There is therefore the problem that the temperature of the cells rises, lowering cell life. Furthermore, since the positive electrode terminals 67 and negative electrode terminals 68 project above the cover at each cell 62, there is the problem that a sealing construction for the large number of electrode terminals and the portions where they pass through becomes necessary, resulting in increased costs.

In this regard, in the rechargeable battery of Laid-open Japanese Patent Publication No. 6-215804, rise in temperature is suppressed to some extent by cooling of the side faces of the housing 71 by the water-cooled jacket 74. Nevertheless, in the case of a secondary battery in which cells are integrated as shown in FIG. 14, the temperature rise of the cells cannot be sufficiently suppressed, because of insufficient cooling between the cells. Moreover, since the inlet orifice 75 and the outlet orifice for supplying and discharging cooling medium to and from the water-cooled jacket 74 protrude above the cover 72, there is a risk that an obstruction may accidentally strike and damage the inlet orifice 75 or outlet orifice, with the result that cooling medium may leak, making cooling impossible.

In the case of the rechargeable battery of Laid-open Japanese Patent Publication No. 61-45571, while the region where the cooling passages are formed that pass through upper and lower portions of partitions between the cells in the mono-block housing is forcibly cooled, the cooling effect is still insufficient, since the entire outside surface of the cells is not forcibly cooled. There are also the problems that, since the construction of the housing is complicated, manufacturing costs are high and, since it is necessary to provide a cover for each cell, a large number of separate operational steps are required in assembly, also raising the cost.

Consideration has been given, as disclosed in the above Laid-open Japanese Patent Publication No. 7-85847 or Laid-open Japanese Patent Publication No. 61-45571, to reducing the number of locations where sealing construction is required at the portions where the terminals pass through, by adopting a construction wherein the electrical connection between cells is effected by means of internal connecting elements. However, in this case, there is the problem that the cooling performance is further lowered, owing to the considerable amount of heat generated in the vicinity of the connecting elements.

Furthermore, in some cases, temperature sensors are provided in the space above the electrode plates of each cell in order to enable counter-measures to be taken when any of the cells reached more than a prescribed temperature. However, there was the problem that the cell temperature could not be detected accurately because of a temperature gap between the spaces and the groups of electrode plates.

SUMMARY OF THE INVENTION

In view of the above problems, an object of the present invention is to provide an integrated sealed secondary battery which is of an inexpensive construction and wherein the cells can be effectively cooled.

Another object of the present invention is to provide an integrated sealed secondary battery wherein there is no risk of damage to the orifices that supply and discharge cooling medium to and from the cooling medium passages and there is no risk of cooling becoming impossible due to leakage of cooling medium. Yet another object of the present invention is to provide an integrated sealed secondary battery wherein, even though electrical connection between the cells is achieved by internal connecting elements so as to reduce cost, the cells and the connecting elements can be effectively cooled.

The present invention provides an integrated sealed secondary battery comprising: a plurality of cells arranged in a row respectively accommodating electricity-generating elements within rectangular tubular cases having a bottom, with their upper open ends being sealed; first cooling medium passages formed on both sides of the row of the cells; and second cooling medium passages formed between the cases of the cells that communicate with the first cooling medium passages on both sides of the row of the cells.

Since all of the side faces of the cells, including those between the cells, can be forcibly cooled by the cooling medium passing through these cooling medium passages, all of the cells can be effectively cooled.

If cooling medium passages are provided on the outside of the cells at the two ends of the integrated sealed secondary battery, the outside faces of the cells at the two ends can also be forcibly cooled.

If a cooling jacket member is joined to both sides and/or both ends of the row of the cells, the cooling medium passages can be constituted easily and with light weight.

If projections are provided on at least one of mutually facing opposite wall surfaces of the cases of the cells, cooling medium passages can be formed in a simple fashion and at low cost over practically the entire surface between the opposite wall surfaces of the cells.

If flow-alignment projecting strips are provided in the cooling medium passages such that the cooling medium flows over the entire surface of the cooling medium passages on both sides of the cell arrangement direction, the whole can be cooled reliably and uniformly, thereby ensuring high cooling performance.

If the cells are mutually joined in integral fashion and their apertures are sealed by an integral cover, an integrated sealed secondary battery of a one-piece housing can be obtained with small numbers of components and assembly steps.

If the cases and cover of the cells, or the cases, cover and cooling jacket members of the cells, are respectively made of synthetic resin and are integrated by being mutually joined by welding, an integrated secondary battery of a one-piece housing can easily be obtained.

If an inlet orifice and outlet orifice for supplying and discharging cooling medium to and from the cooling medium passages are provided at both ends of the row of the cells and are connected to the cooling medium passages on both sides through distribution headers, cooling medium can be supplied and evacuated from a single inlet orifice and outlet orifice, making it possible to simplify the cooling piping of the secondary battery.

If the cooling medium passages are formed respectively between the cases of each two cells, the flow path cross-sectional area of a single cooling medium passage over its entire length can be made large, making it possible to reduce pressure losses in the cooling medium passage.

Another aspect of the present invention is that an inlet orifice and an outlet orifice for supplying and discharging cooling medium to and from the cooling medium passages are mounted in recesses of the integral cover for closing the open ends of the cell cases such as not to protrude beyond the planar external dimension of the integral cover.

Since the orifices do not protrude beyond the external shape of the cover, there is scarcely any risk of the orifices being damaged by accidentally striking an obstruction, so the risk of cooling becoming impossible due to leakage of cooling medium can be eliminated.

If the connection ports of the inlet orifice and outlet orifice are arranged in a horizontal direction, when a plurality of secondary batteries are arranged in parallel, the connecting pipes that effect connection between the orifices can be laid horizontally, so they do not protrude above the cover. The task of connecting the piping of the connecting pipes is easy and the piping can be kept compact and there is no risk of its being damaged.

The inlet orifice and outlet orifice are comprised of J-shaped box elements whose underside is open and whose planar shape is approximately J-shaped, with the connection ports projecting from the tip of the short side, so as not to protrude beyond the tip of the long side of the J-shaped box elements. These J-shaped box elements are joined to the cover, while connecting apertures communicating with the cooling medium passages are formed in the cover at positions facing to the tip of the long side of the J-shaped box elements. By this arrangement, the orifice can be mounted to the cover in such a manner that the connection ports are protected by the long side of the J-shaped box element. Furthermore, since the connecting apertures communicating with the cooling medium passages are positioned at the tip of the long side of the J-shaped orifice, the connection ports and connecting apertures can both be positioned at both ends of the secondary battery, making it possible to achieve a compact construction of the secondary battery as a whole.

Corresponding recesses are formed on one side at both ends of the cover for receiving the J-shaped box elements therein such that the long side is arranged on the outside, while the short side is arranged on the inside. Thereby, the connection ports are protected by the long side of the J-shaped box elements. Also, the overall construction of the secondary battery can be made compact, since the electrode terminals may be arranged on the other side of the cover, with the safety valves of the cells being arranged in the middle.

Yet another aspect of the present invention is that connecting elements for electrically connecting adjacent cells are disposed inside of the integral cover, and cooling medium passages are also formed above these connecting elements.

Since all of the side faces of the cells, including those between the cells, can be forcibly cooled by cooling medium passing through the cooling medium passages and the cooling passages between the cases, and furthermore the connecting elements can be cooled from above, all the cells and the internal connecting elements can be effectively cooled. Furthermore, since no differences are produced between the temperatures of the elements for electromotive force and the spaces, because the spaces above the elements for electromotive force in the cells are cooled by the cooling medium flowing through the connecting element cooling passages, precise measurement of the cell temperatures can be achieved by temperature sensors arranged in these spaces.

Cooling medium passages are constituted by joining plate-shaped cooling jacket members on both sides of the row of the plurality of cells, the upper ends of these cooling medium passages being linked to both ends of the connecting element cooling passages. Thus the cooling medium can flow through from the cooling medium passages into the connecting element cooling passages. Furthermore, the integrated sealed secondary battery can be constructed with light weight and low cost, thanks to the use of compact plate-shaped cooling jacket members.

While novel features of the invention are set forth in the preceding, the invention, both as to organization and content, can be further understood and appreciated, along with other objects and features thereof, from the following detailed description and examples when taken in conjunction with the attached drawings.

PREFERRED EMBODIMENTS OF THE INVENTION

Preferred embodiments of the integrated sealed secondary battery according to the present invention will be described below with reference to the accompanying drawings.

Figure 1:
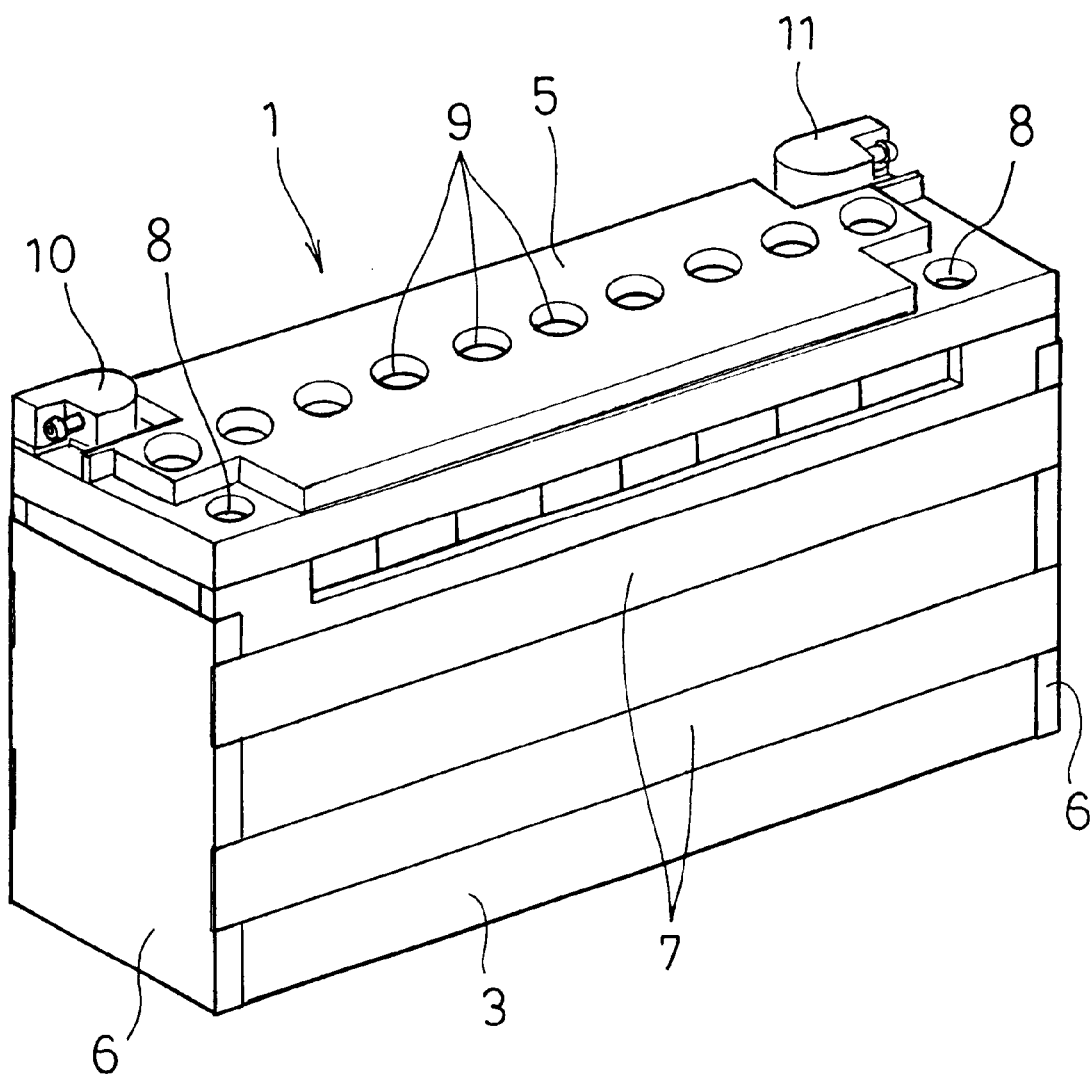
FIG. 1 is an external perspective view of one embodiment of an integrated sealed secondary battery according to the present invention.
Figure 2:
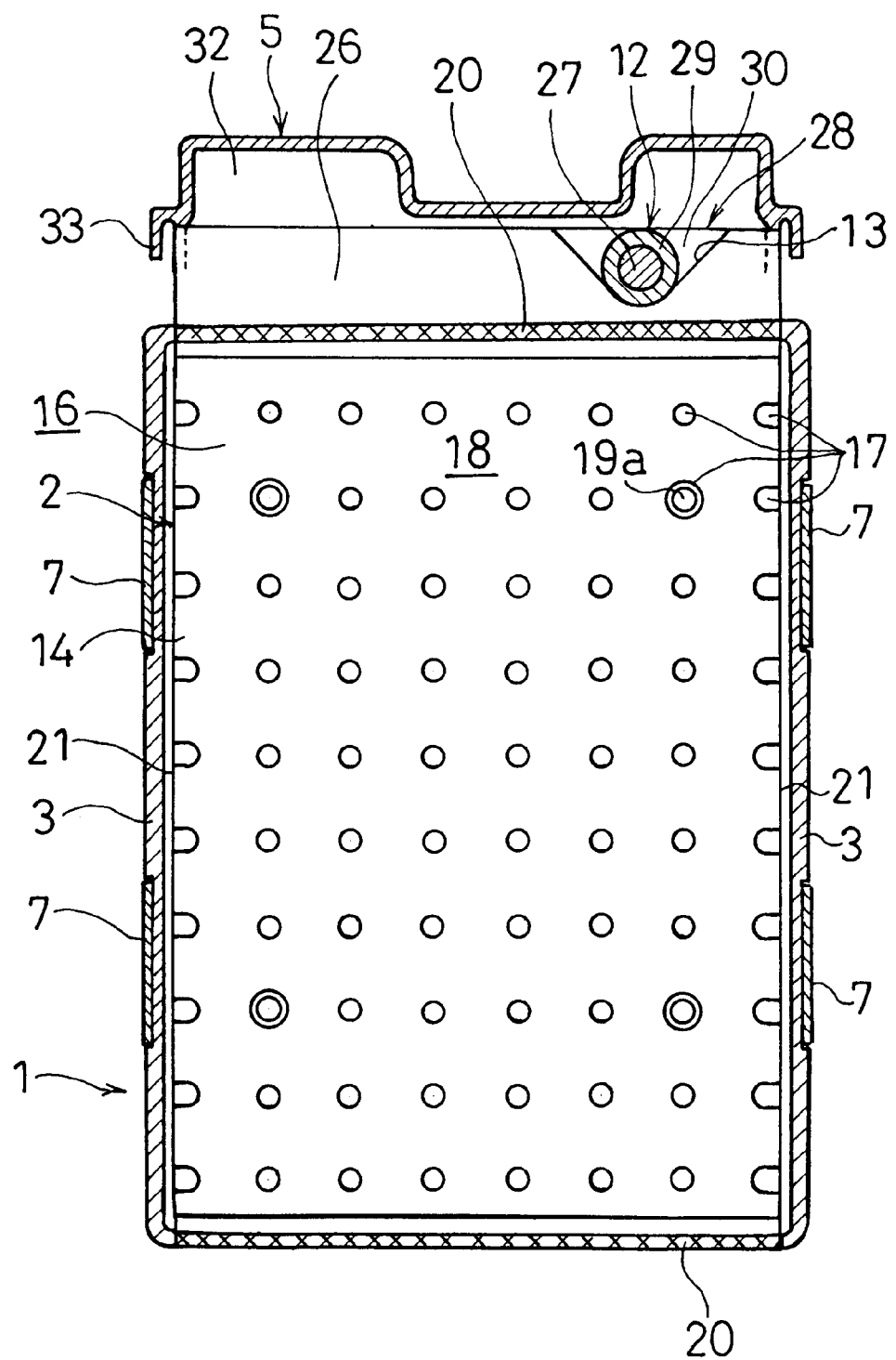
FIG. 2 is a vertical cross-sectional view of this embodiment.
Figure 3:
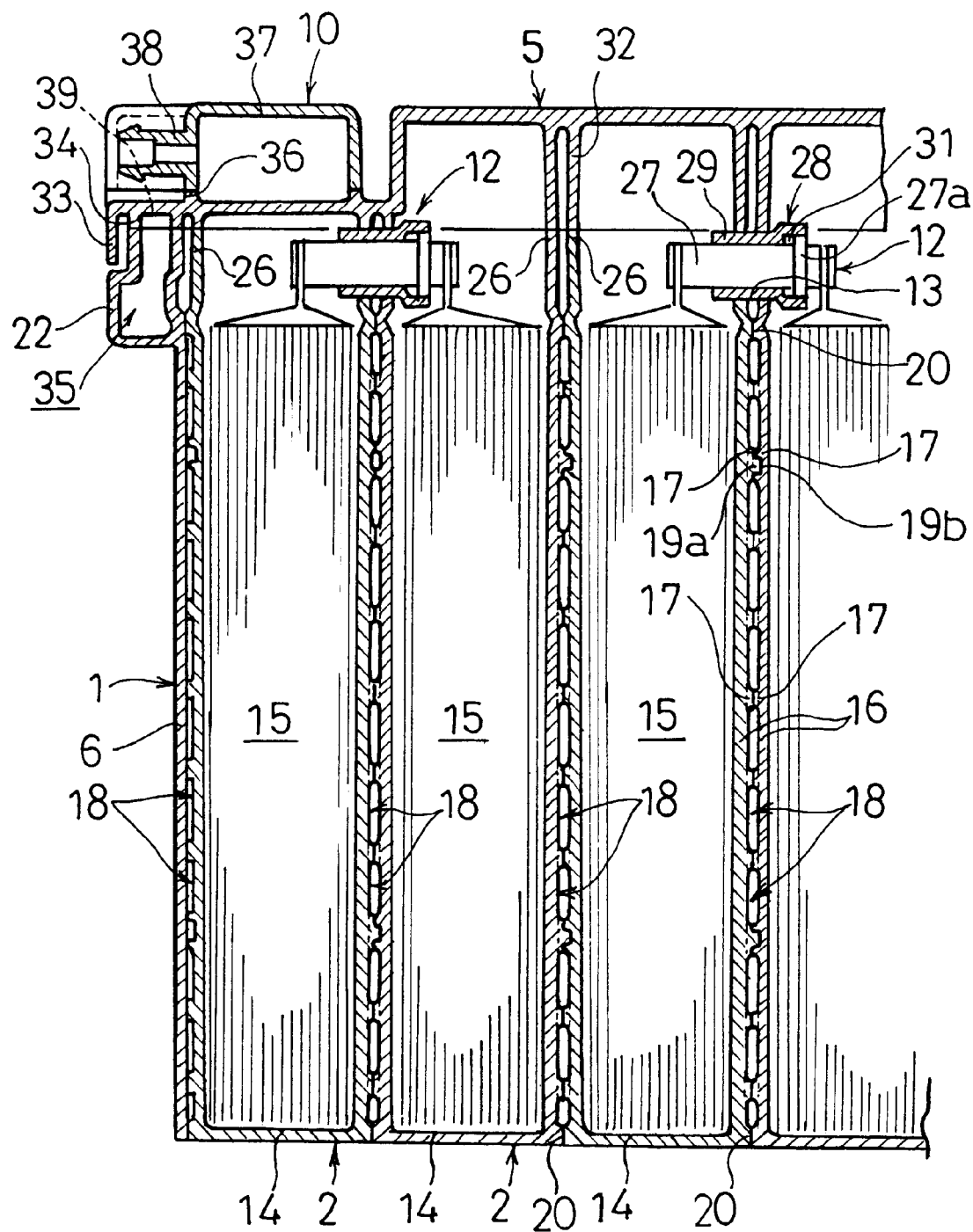
FIG. 3 is a partial vertically sectioned front view of this embodiment.

The integrated sealed secondary battery 1 according to this embodiment is a nickel/hydrogen secondary battery suitable for use as a drive power source for an electric automobile. As shown in FIG. 1 to FIG. 3, the integrated sealed secondary battery 1 comprises a one-piece battery housing obtained by mutually joining a plurality of individual cells 2 that are connected in series and arranged in a row. End plates 6 are joined at both ends of the row of cells, and a plate-shaped cooling jacket member 3 with inwardly concave spaces are joined to both sides of the cells 2 and end plates 6. Further, an integrated cover 5 is joined on the top of the cells 2 and end plates 6 for closing these in a sealed condition. The cells 2 between the end plates 6, 6 are tightly bound together by restraining bands 7. Numeral 8 represents terminal mounting holes formed in the cover 5 to permit the positive electrode terminals and/or negative electrode terminals projecting in the upwards direction from cells 2 at one end and at the other end to pass therethrough. Numeral 9 represents safety valve mounting holes formed in the cover 5 corresponding to each cell 2. Numerals 10 and 11 respectively represent an inlet orifice and outlet orifice for a cooling medium, these being integrally mounted at both ends of the cover 5. Cells 2, cooling jacket member 3, cover 5, end plates 6, inlet orifice 10, and outlet orifice 11 are constituted of synthetic resin such as PP/PPE alloy, and are integrally joined to each other by welding. Adjacent cells 2,2 are electrically connected by connectors 12 as shown in FIG. 2 and FIG. 3.

Referring to FIG. 2 and FIG. 3, cells 2 are constituted by electricity-generating elements 15 accommodated within cases 14 of rectangular tubular shape having a bottom. A large number of bosses 17 are projected in matrix fashion on opposite wall faces 16 of mutually opposite cases 14 of the cells 2 such as to contact with each other in the condition in which cells 2 are arranged adjacent to each other in a row. The spaces formed between opposite wall faces 16,16 by these bosses 17 constitute cooling medium passages 18 between the cases. It should be noted that end plates 6 are in contact with and joined to opposite wall faces 16 on the outside of the two end cells 2 of the row of cells, so that in this embodiment a cooling medium passage 18 is also formed between these end plates 6 and the opposite wall face 16 of two end cells. A plurality of bosses 17 in suitable locations (in the example illustrated, four locations) are formed of larger diameter, their end faces being formed with engagement projections 19a and engagement recesses 19b for mutual sliding engagement, which are employed for mutual positional location of the cases 14. Also, joining edges 20 project to effect mutual contact at the bottom edge and at a position a suitable distance below the upper end of the case 14. Thus, cells 2 can be integrally joined in the form of a one-piece battery housing by mutual welding of bosses 17 and joining edges 20 that are in mutual contact in a condition where cells 2 are arranged adjacent to each other in a row.

Cooling medium passages 21 are constituted on both sides with respect to the direction of arrangement of these cells 2 by the spaces formed between the inside faces of the cooling jacket member 3 and cells 2. Further, troughs 22 that form distribution headers and communicate with the cooling medium passages 21 on both sides for distributing cooling medium (water) are formed at the upper edges of the end plates 6.

Figure 4:
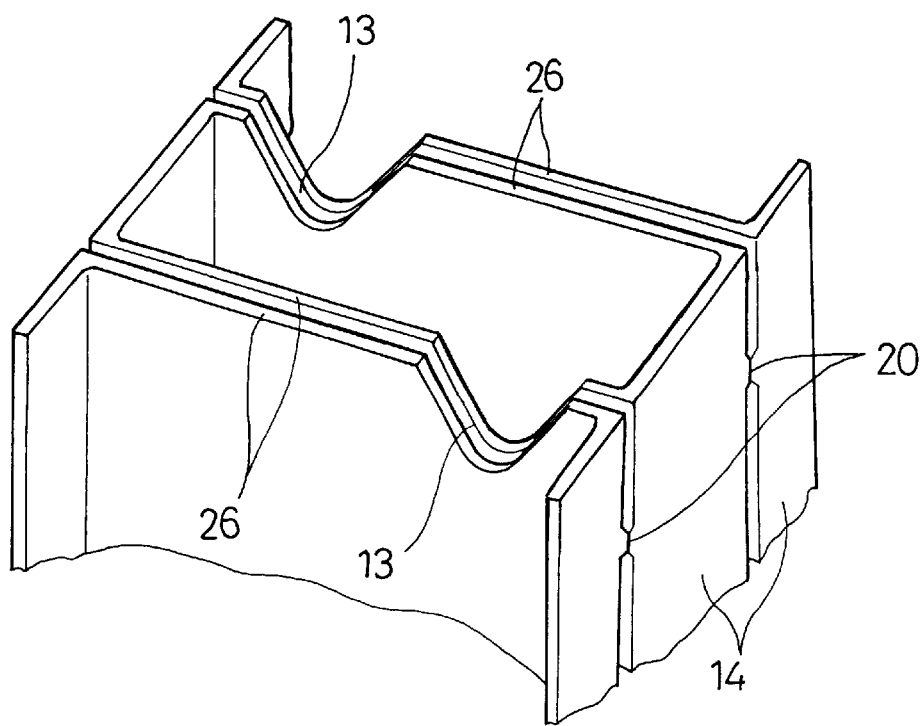
FIG. 4 is a partial perspective view of an intermediate cover of the same embodiment.

As shown in FIG. 2, FIG. 3 and FIG. 4, in an upper frame 26 above the upper joining edges 20 in the cases 14 of cells 2 which are to constitute the integral battery housing, there are formed practically triangular-shaped notches 13 in zig-zag fashion for arranging connectors 12 to effect electrical connection of adjacent cells 2. The connectors 12 fitted in the notches 13 are integrally joined to the cases 14 and to the cover 5 in a sealed condition.

Figure 5:
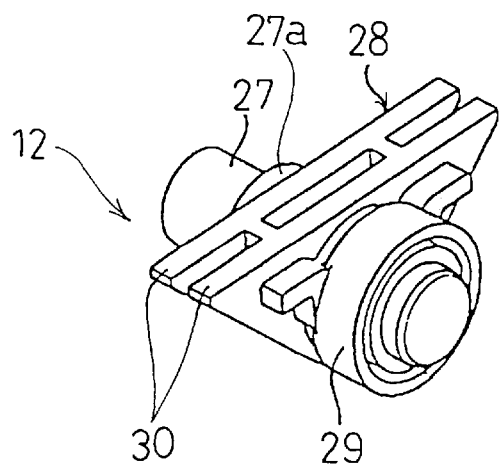
FIG. 5 is a perspective view of an electrical connection element of this embodiment.

As shown in FIG. 2, FIG. 3 and FIG. 5, the connector 12 comprises a connecting shaft 27 made of metal (such as nickel) and a support element 28 made of synthetic resin. The connecting shaft 27 is inserted into a holding tube 29 of the support element 28 in a pressed-in condition, perfect sealing being effected by an O-ring 31 that is inserted between a flange 27a of the connecting shaft 27 and the inner circumference of the holding tube 29. A pair of triangular-shaped lugs 30 project from the holding tube 29 of the support element 28. These lugs 30 are respectively joined to the upper frame 26 when the connector 12 is arranged in the notch 13.

As shown in FIG. 2 and FIG. 3, the cover 5 is formed on its inside surface with individual frames 32 so as to correspond with the upper frames 26 of the cases 14. Also, at the outer circumference, there is provided a downwardly directed outer circumferential frame 33 of inverted L-shaped cross section. At both ends in the longitudinal direction of the cover 5, there are provided sealing projections 34 that are joined to the upper end of the troughs 22 for forming sealed distribution headers 35.

Figure 6:
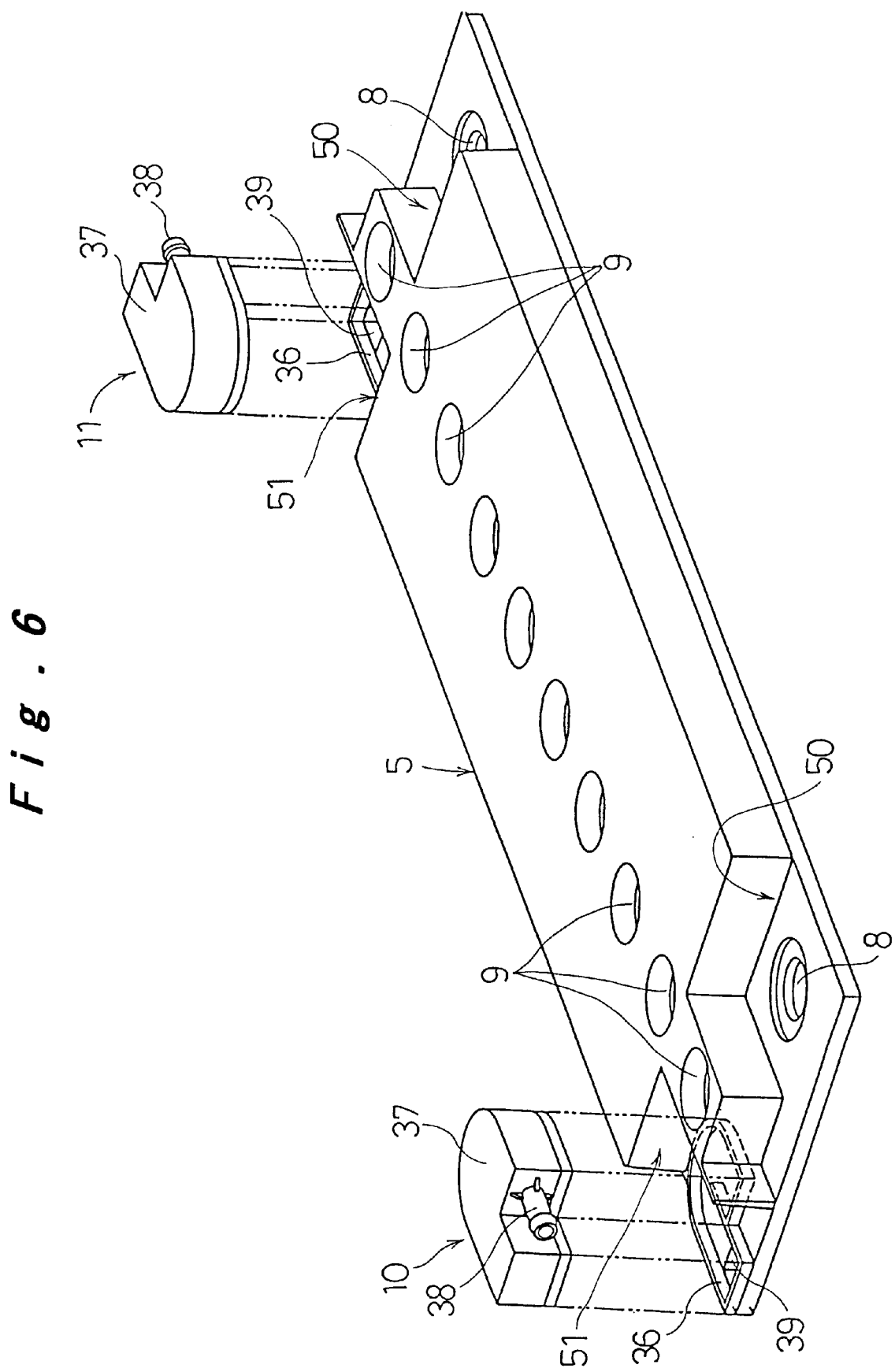
FIG. 6 is a perspective view of a cover of this embodiment.

As shown in FIG. 6, on one side of the two ends of the cover 5, there is formed a terminal mounting hole 8, while on the other side there is provided joining projections 36 for joining the inlet orifice 10 and outlet orifice 11. These orifices 10, 11 are respectively comprised of J-shaped box elements 37 whose planar surface is approximately J shaped and whose underside is open. Connecting ports 38 are provided to the tip of the short side of these J-shaped box elements 37. In a portion of the cover 5 opposite the tip of the long side of J-shaped box element 37, connecting apertures 39 that communicate with the distribution headers 35 are formed.

Figure 7A:
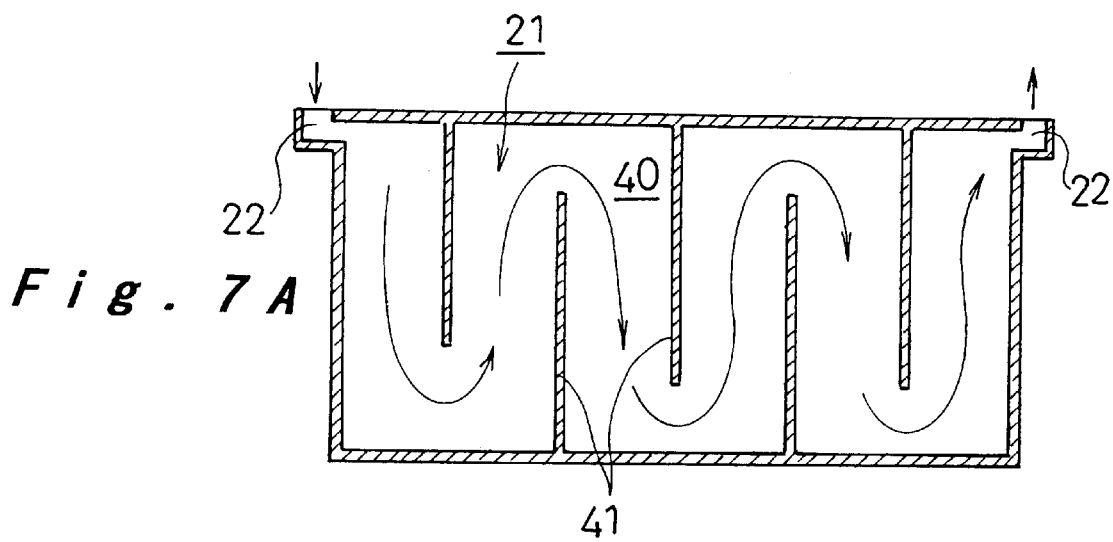
FIGS. 7A–7C are vertical cross-sectional views of the same embodiment showing examples of various types of layout in the cooling medium passages on both sides.
Figure 7B:
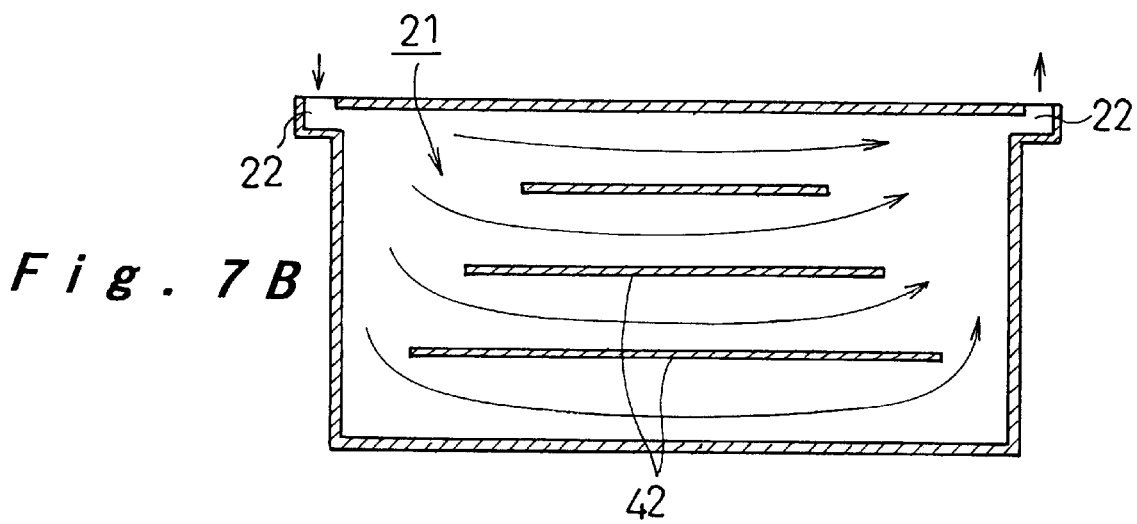
Figure 7C:
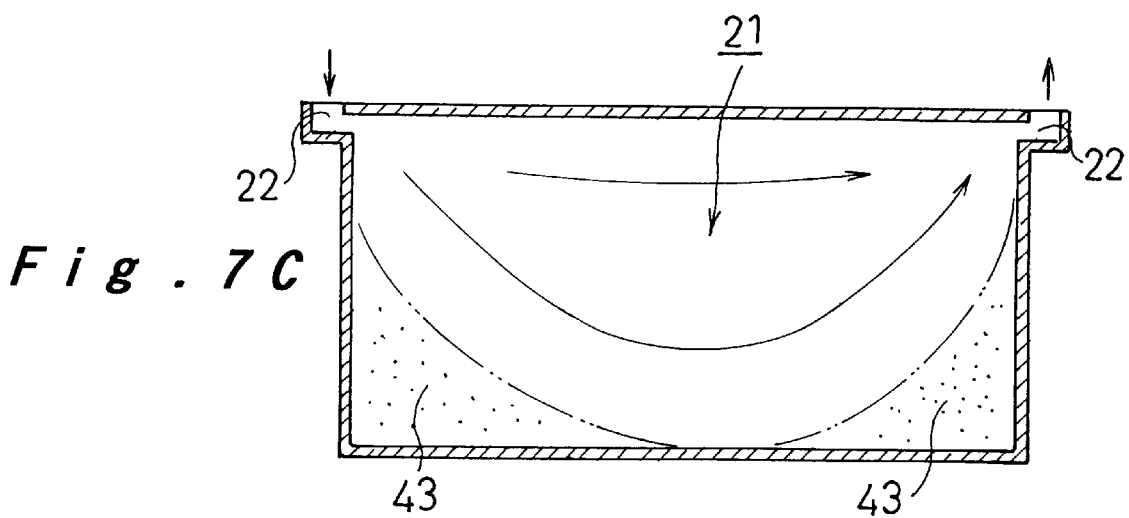

Referring now to FIGS. 7A–7C, flow-alignment projecting strips 41 are provided for forming a meandering flow passage 40 that meanders upwards and downwards so as to achieve uniform flow of the cooling medium over the entire surface of cooling medium passage 21. Instead of the flow-alignment projecting strips 41 as shown in FIG. 7A, a plurality of flow-alignment projecting strips 42 in the horizontal direction which are shorter at the top and longer at the bottom, being arranged with suitable separation in the vertical direction as shown in FIG. 7B, may be provided. It should be noted that, although it is not essential to provide these flow-alignment projecting strips 41, 42, if they are not provided, there is a risk of a stagnant region 43 of the cooling medium being produced at the bottom on both sides of cooling medium passage 21 as shown in FIG. 7C, resulting in insufficient cooling of the bottom portions of cells 2 at both ends in the direction of arrangement. It is therefore preferable to provide such flow-alignment projecting strips 41, 42. These flow-alignment projecting strips 41, 42 can be provided on the side of the cases 14 of the cells 2.

In the integrated sealed secondary battery 1 constructed as above, when the cooling medium is supplied from the inlet orifice 10, it flows into the cooling medium passages 21 on both sides through the distribution header 35, and while flowing towards the downstream side through these cooling medium passages, it also flows between these two cooling medium passages 21, 21 through the cooling medium passages 18 between the cells 2, before it is discharged from the outlet orifice 11. Consequently, all of the four side faces of the cells 2 can be efficiently cooled.

Furthermore, since the one-piece battery housing is constituted by integrally connecting the individual cells 2 by welding with their apertures being sealed by the integral cover 5 welded thereonto, the integrated sealed secondary battery 1 encased in a one-piece housing can be obtained with a small number of components and assembly steps. Also, the cooling medium passages 18 between the cases are formed by mutual contact and welding of the bosses 17 formed on opposite wall faces 16 of the cases 14 of each of the cells 2. Consequently, cooling medium passages 18 between the cases can be formed over the entire surface of the opposing wall faces 16,16 in a simple and inexpensive manner.

Moreover, a lightweight construction can be achieved, since the cooling medium passages 21 on both sides are constituted by joining compact plate-shaped cooling jacket members 3 on both sides of the row of cells.

Also, in this embodiment, the inlet orifice 10 and outlet orifice 11 that supply and evacuate the cooling medium with respect to the cooling medium passages 21 are provided at both ends of the row of the cells, and are connected to the cooling medium passages 21 through the distribution headers 35. Consequently, when a plurality of secondary batteries 1 are connected to each other, the entire periphery of all of the cells 2 can be effectively cooled by a single cooling medium path.

Figure 8A:
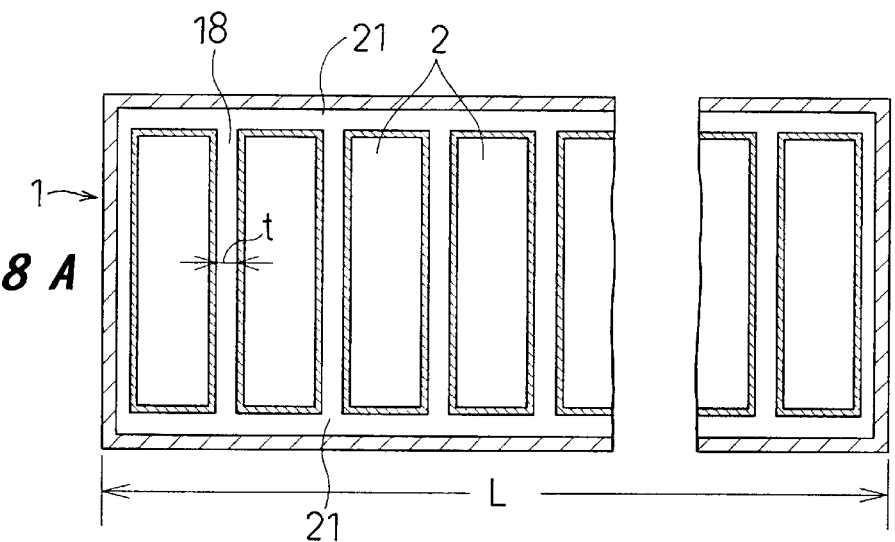
FIGS. 8A and 8B are diagrammatic horizontal cross-sectional views showing the mode of arrangement of the cooling medium passages in the same embodiment, and a modified example thereof.
Figure 8B:
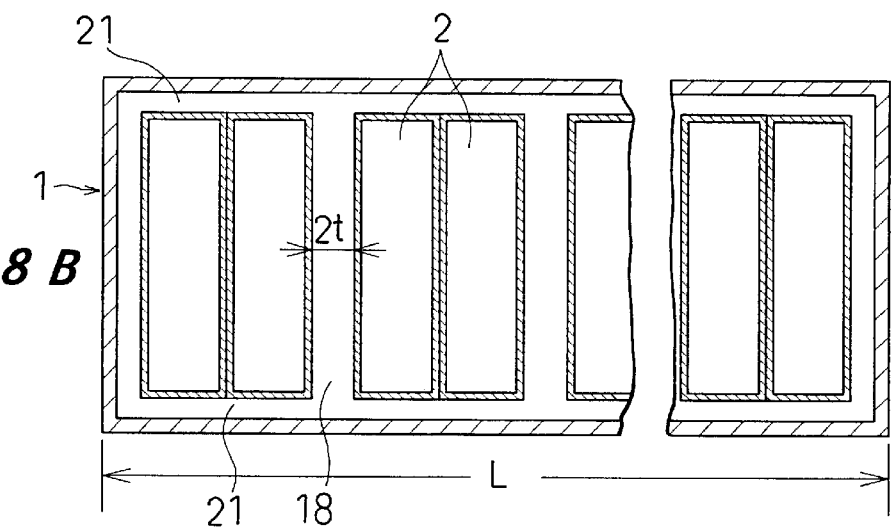

It should be noted that, although in the description of the above embodiment, an example was illustrated in which cooling medium passages 18 were arranged between each of the cells 2, 2 as shown in FIG. 8A, the cooling medium passages 18 may be formed respectively between each of two cells 2 as shown in FIG. 8B. In this case, while the total length L of the secondary battery 1 is kept the same, the width of the cooling medium passages 18 can be changed from t to 2t, enabling the flow path cross-sectional area to be increased; pressure loss in these cooling medium passages 18 can thereby be reduced.

Figure 9A:
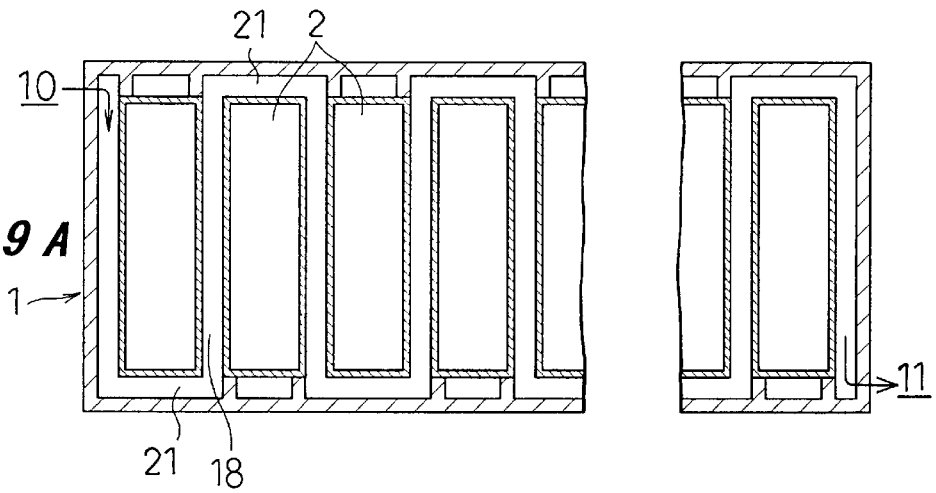
FIGS. 9A and 9B are diagrammatic horizontal cross-sectional plan views of another example of the arrangement of flow paths forming the flow of cooling medium in the same embodiment.
Figure 9B:
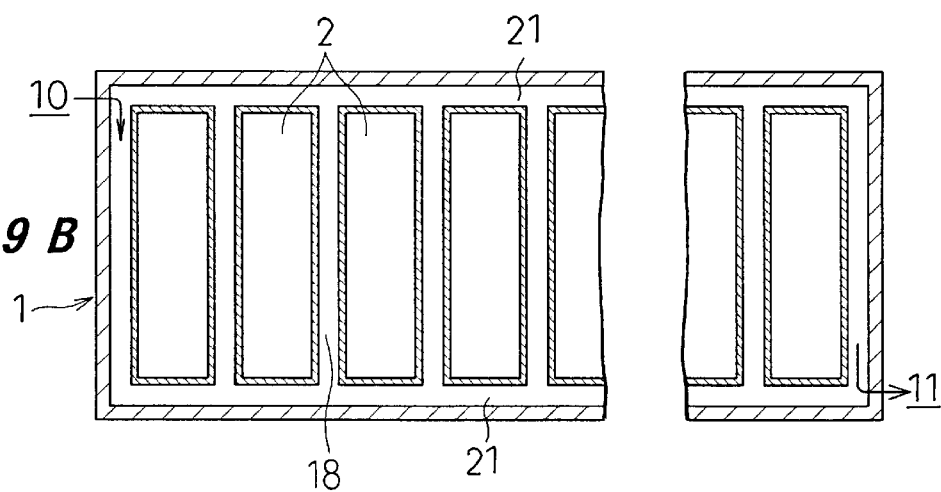

Also, the inlet orifice 10 and outlet orifice 11 may be provided in diagonally opposite positions as shown in FIGS. 9A and 9B. In the example of FIG. 9A, meandering passages are formed by the cooling medium passages 21 on both sides and the cooling medium passages 18 between the cells. On the other hand, in the example of FIG. 9B, it is arranged for cooling medium to flow into each of the cooling medium passages 18 by arranging the inlet orifice 10 at one end of the cooling medium passage 21 on one side and arranging the outlet orifice 11 at one end in the diagonally opposite position of cooling medium passage 21 on the other side.

Figure 10:
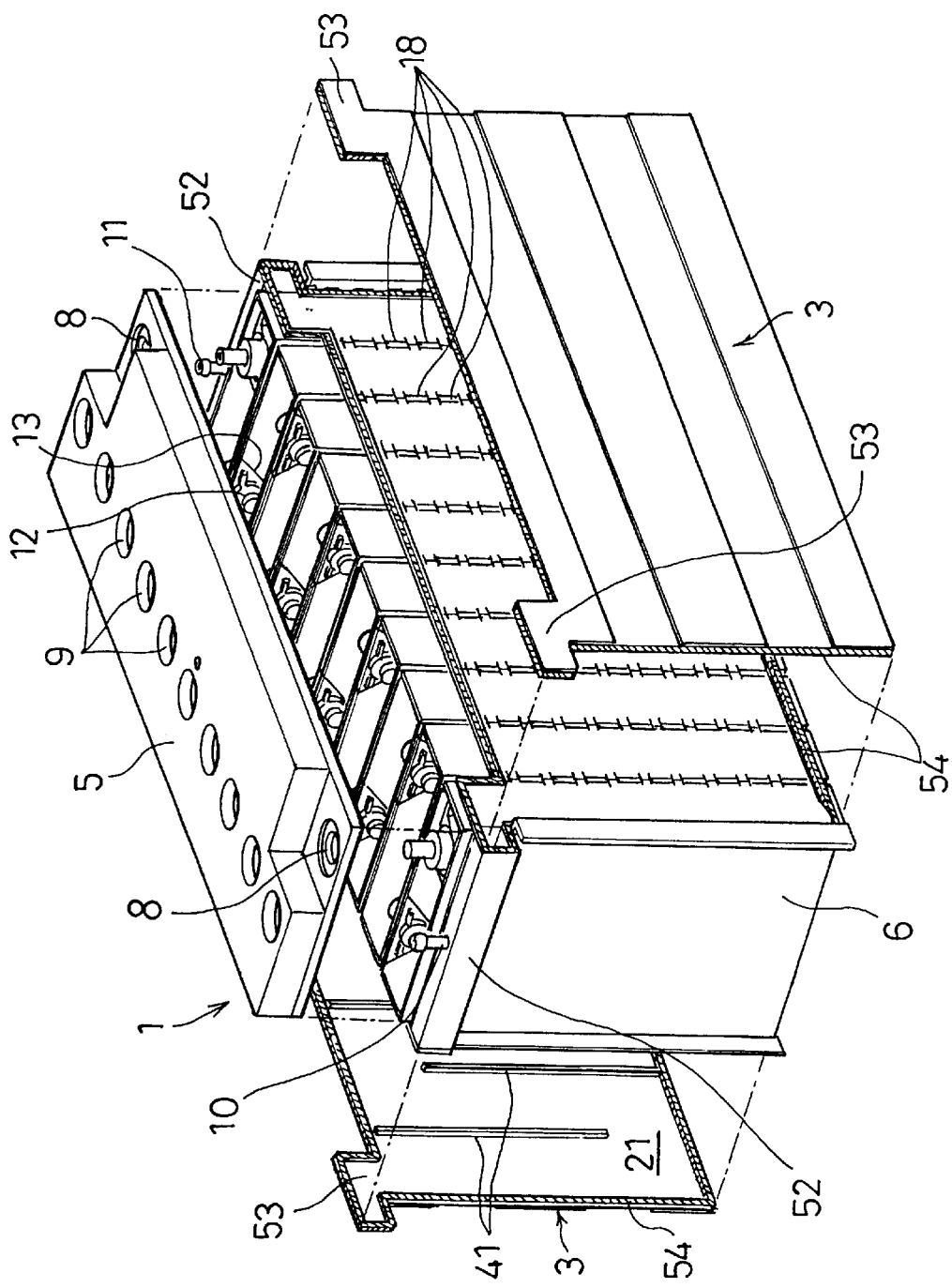
FIG. 10 is an exploded perspective view of another embodiment of an integrated sealed secondary battery according to the present invention.

In the above embodiment, an example was illustrated in which the end plates 6 are covered with the cover 5, with the inlet orifice 10 and outlet orifice 11 being provided in the cover 5. However, as shown in FIG. 10, the cover 5 may be constructed so as to cover only the group of cells 2, distribution headers 52 being integrally provided at the tops of end plates 6 at both ends, with the inlet orifice 10 or the outlet orifice 11 projecting at the upper surface thereof, and a connection portion 53 for connecting the cooling medium passages 21 with the distribution headers 52 at both ends being formed at the upper edge of both ends of the cooling jacket member 3. The portions indicated by the shading in FIG. 10 are the welds 54 of the integrated unit constituted by cells 2 and the cooling jacket members 3.

With this embodiment, essentially the same beneficial actions as in the embodiment described above are obtained. Also, although, in the embodiments described above, examples were illustrated in which the various constructional members were joined by welding, joining could be effected using adhesive.

Referring back to FIG. 6, the cover 5 has two recessed portions 50, 51 on both sides at both ends thereof. The terminal mounting holes 8 are formed in the recesses 50 formed on one side of both ends of the cover 5. In the recesses 51 on the other side of both ends of the cover 5, joining projections 36 are provided for receiving the inlet orifice 10 and outlet orifice 11. These orifices 10, 11 are arranged within the recesses 51 so that they do not project beyond the planar external shape of the cover 5. The orifices 10, 11 are respectively comprised of J-shaped box elements 37 whose underside is open and whose planar shape is approximately J-shaped. Connecting ports 38 are provided to the tip of the short side of the J-shaped box elements 37. Connecting apertures 39 communicating with the distribution headers 35 are formed in the cover 5 at locations facing the tip of the long side of the J-shaped box elements 37.

Since the inlet orifice 10 and the outlet orifice 11 are arranged within the recesses 51 such that they do not protrude beyond the planar external shape of the cover 5, there is scarcely any risk of their being damaged by accidental contact with an obstruction, so the risk of cooling becoming impossible due to leakage of cooling medium can be eliminated. Also, since the connection ports 38 of the inlet orifice 10 and outlet orifice 11 are arranged in the horizontal direction, when a plurality of secondary batteries are arranged in parallel, the connection piping that makes connection between the orifices 10 and 11 can be disposed horizontally, and so does not protrude above the cover 5, so the task of connecting up the piping is easy, the piping can be accommodated in a compact manner and there is no risk of its becoming damaged.

In this embodiment, the recesses 51 in which the orifices 10 and 11 are mounted are formed at the side rather than at the middle at both ends of the cover 5. However, they are arranged such that the long side of the J-shaped box elements 37 is positioned on the outside and the short side is positioned on the inside, the connection ports 38 are protected by the long side of this J-shaped box elements 37.

Also, since the connection ports 38 protrude from the tip of the short side of the J-shaped box elements 37, and the connecting apertures 39 communicating with the cooling medium passages are arranged at the tip of the long side, the connection ports 38 and connecting apertures 39 can both be positioned at both ends of the secondary battery 1, enabling a compact construction of the secondary battery as a whole to be achieved. Furthermore, by the arrangement wherein the electrode terminals are arranged in the recesses 50 formed on one side of the cover 5, while the orifices 10 and 11 are mounted in the recesses 51 formed on the other side of the cover 5, with the safety valves of the cells being arranged in the middle, an even more compact construction of the secondary battery as a whole is achieved.

Next, another embodiment of the present invention will be described, in which a cooling jacket member of a different construction is employed.

Figure 11:
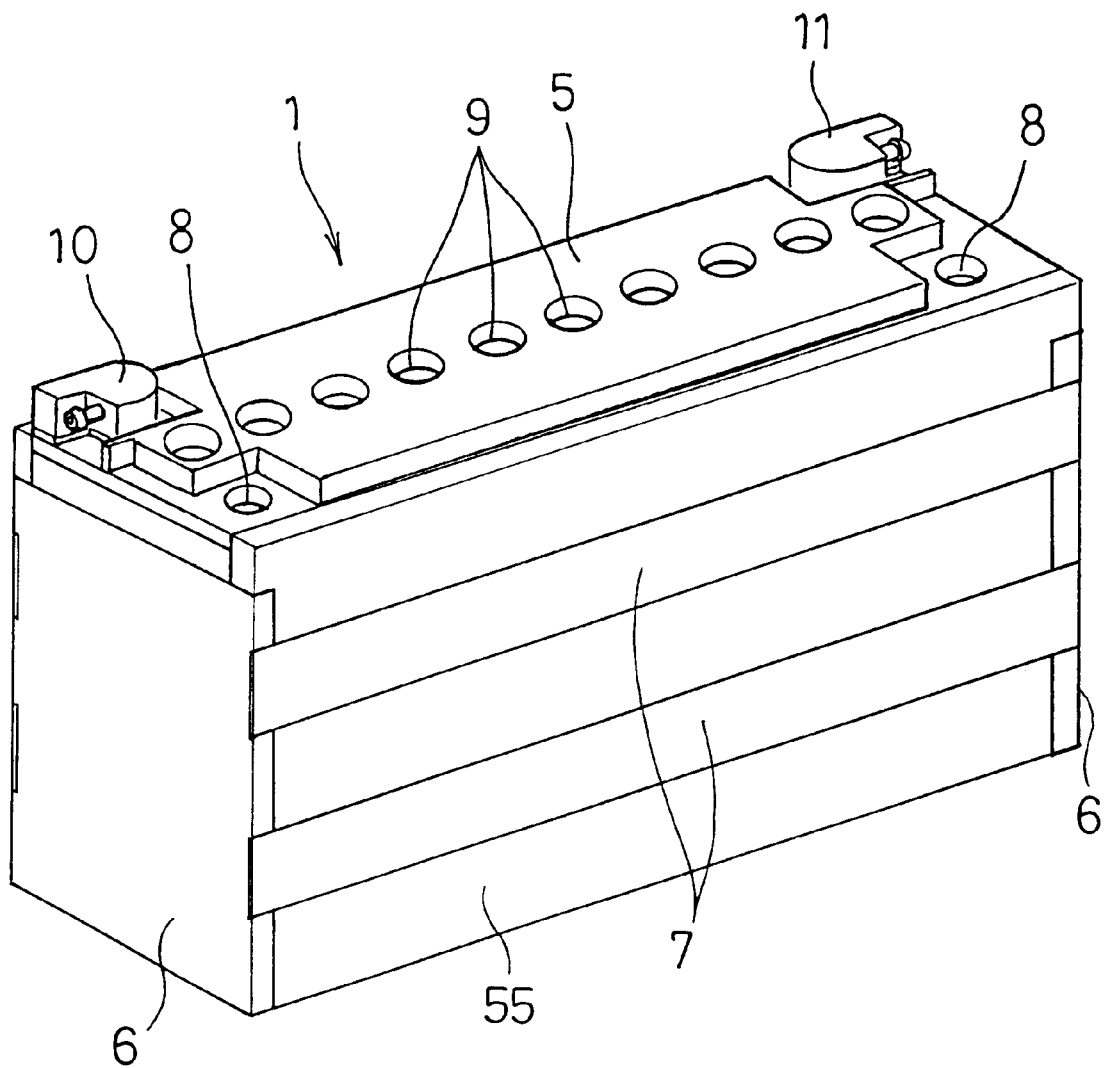
FIG. 11 is an external perspective view of yet another embodiment of an integrated sealed secondary battery according to the present invention.
Figure 12:
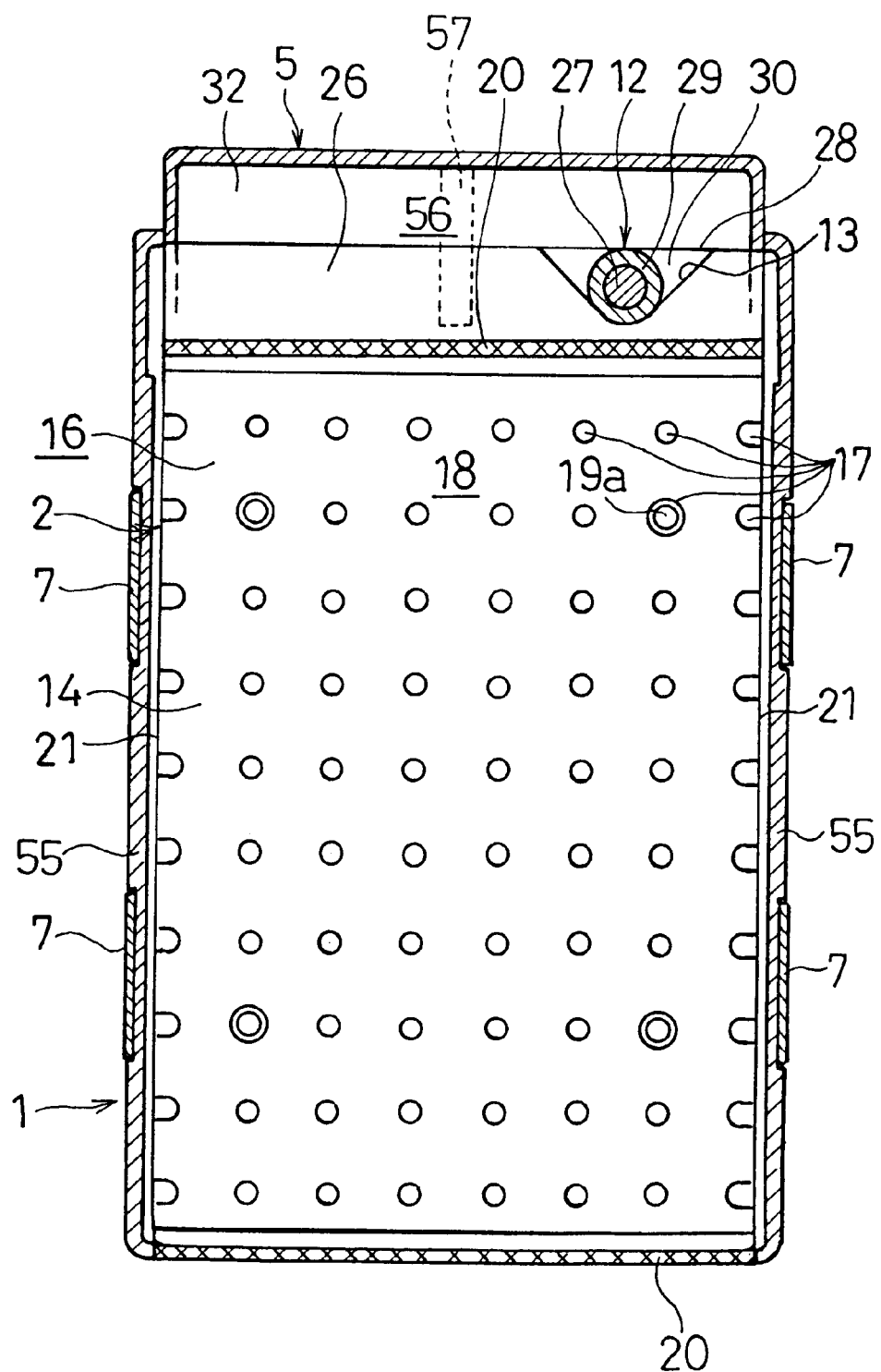
FIG. 12 is a vertical cross-sectional view of this embodiment.

As shown in FIG. 11 and FIG. 12, the cooling jacket member 55 of this embodiment extends above the upper ends of the cells 2 to below the side face of the cover 5. Consequently, the cooling medium passages 21 on both sides extend to above the tops of the cases 14. Although not shown, flow-alignment projecting strips are formed on the inside faces of the cooling medium passages 21 for forming meandering flow passages that meander upwards and downwards so that the cooling medium is made to flow uniformly over the entire surface of the cooling medium passages 21.

Figure 13:
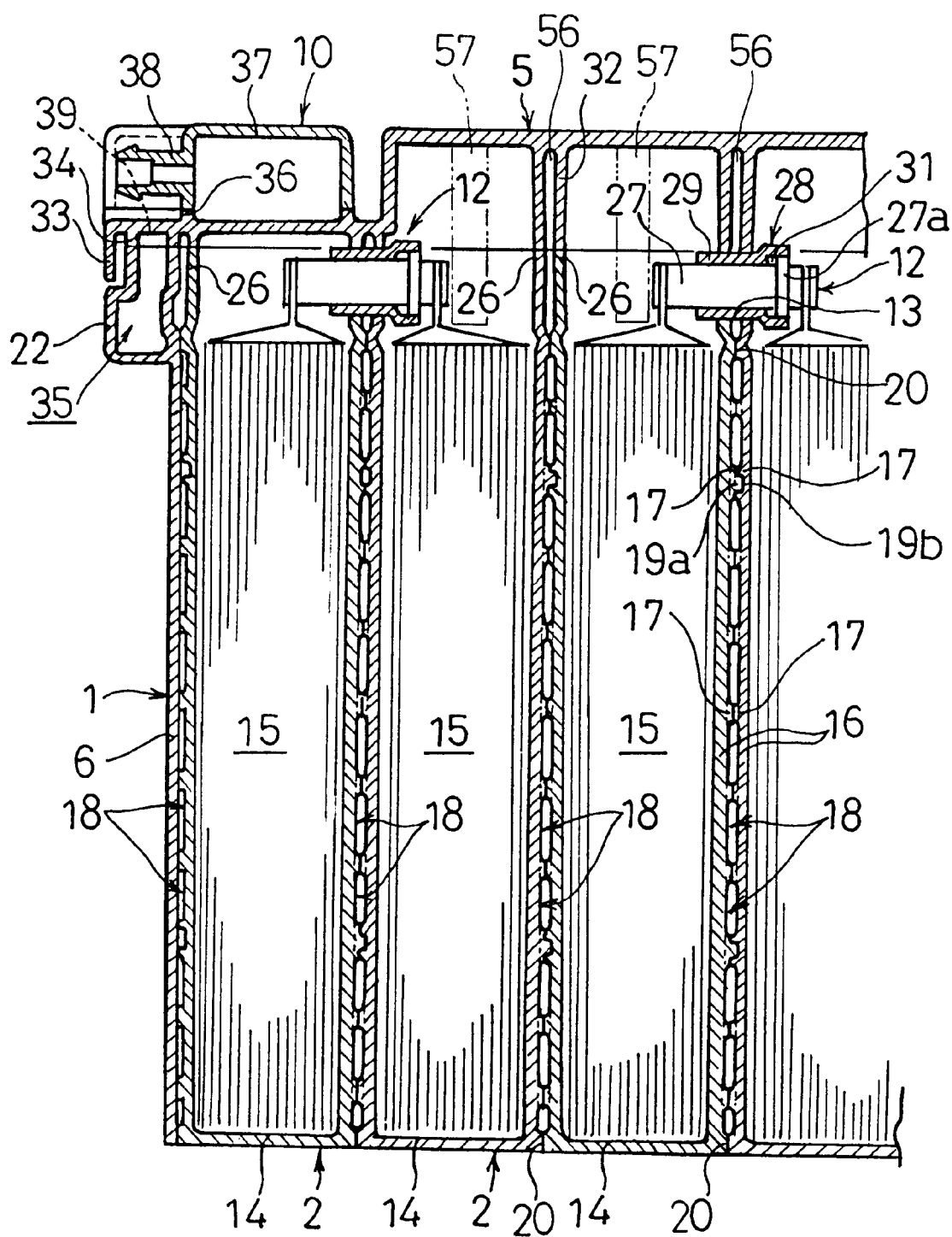
FIG. 13 is a partial vertically sectioned front view of this embodiment.
Figure 14:
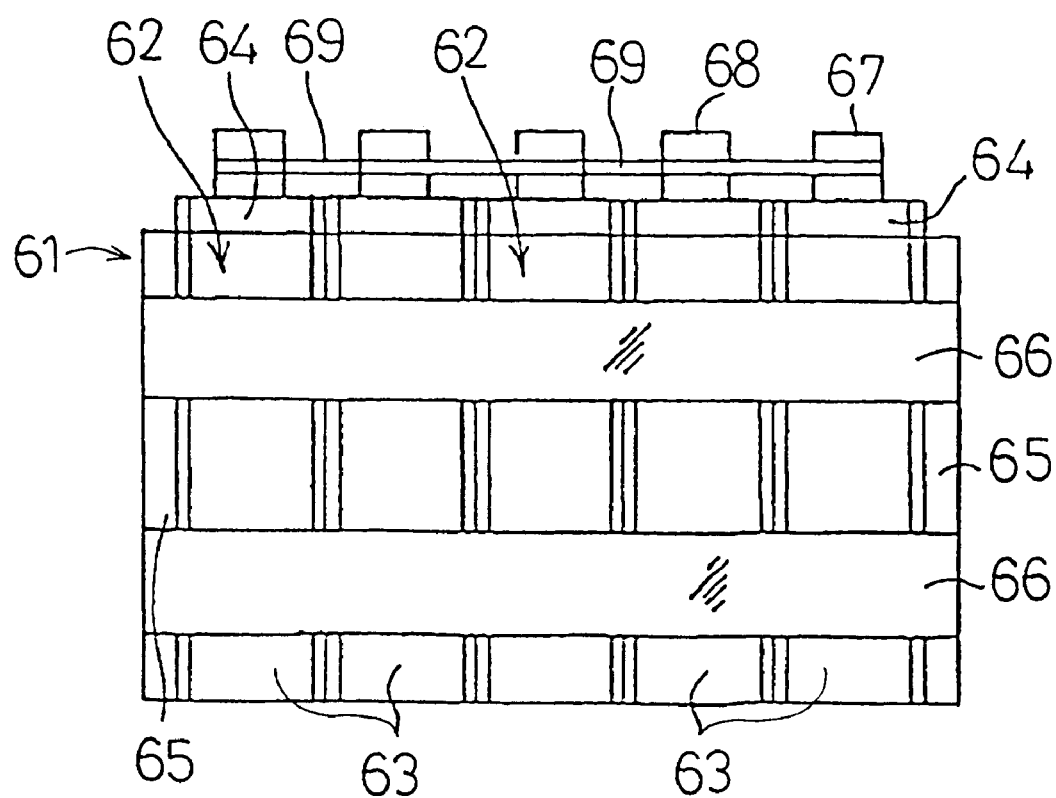
FIG. 14 is a front view of a prior art example of an integrated sealed secondary battery.
Figure 15:
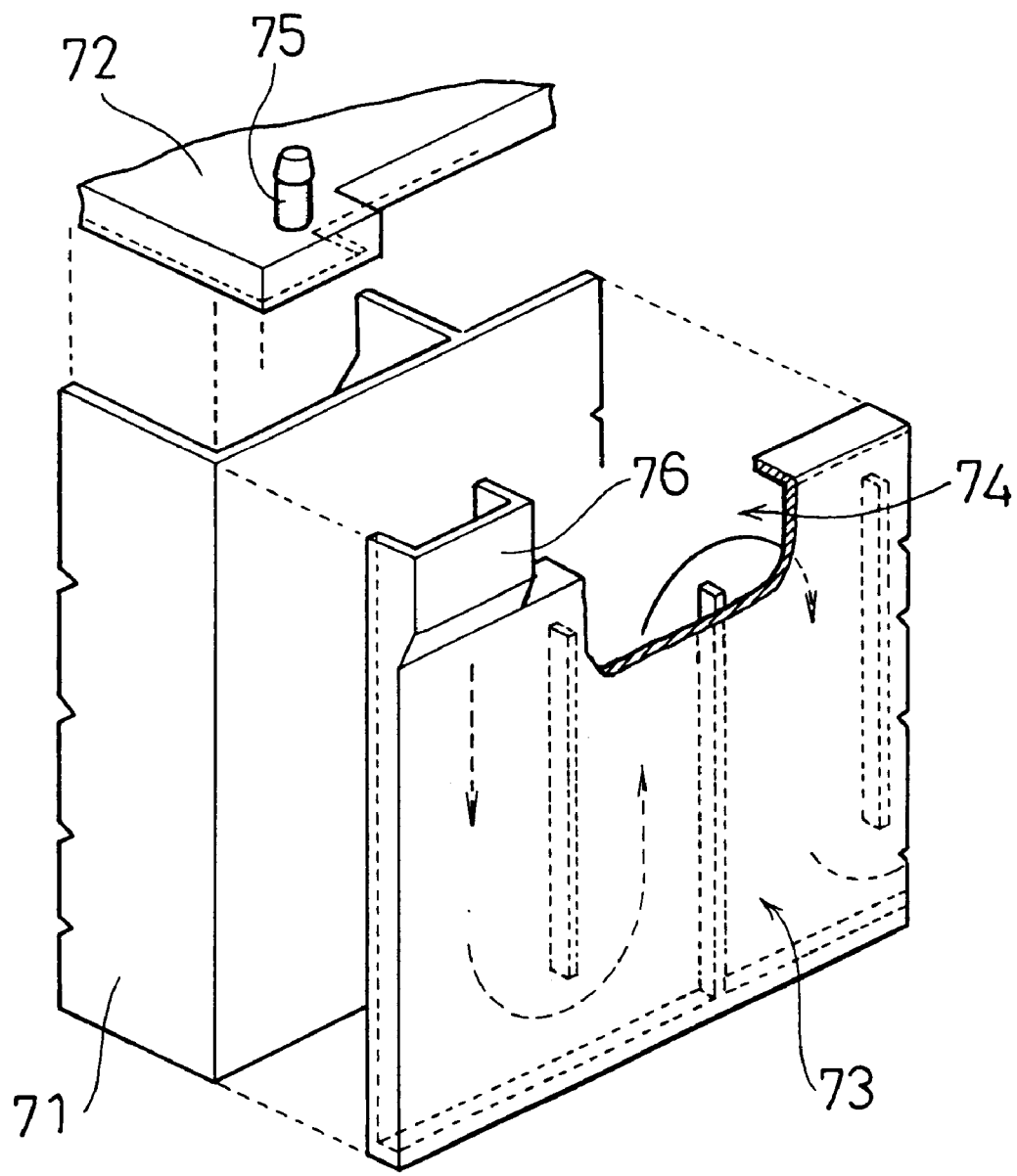
FIG. 15 is an exploded perspective view of major parts of a cooling jacket in a further prior art example of an integrated sealed secondary battery.

Referring to FIG. 12 and FIG. 13, adjacent cells 2 are electrically connected by connectors 12 fitted in the notches 13 formed in the cases 14 as has been described above. The spaces formed between the upper frames 26, 26 constitute lower halves of connecting element cooling passages 56 for cooling the connecting elements 12. The upper ends of the cooling element passages 21 are linked to both ends of these connecting element cooling passages 56.

As shown in FIG. 12 and FIG. 13, the cover 5 is formed on its inside surface with individual frames 32 corresponding to the upper frames 26 of the cases 14. The spaces between the individual frames 32, 32 constitute the upper halves of the connecting element cooling passages 56.

Also, temperature sensors 57 are suspended from the upper wall of the cover 5, at about the middle of the spaces above the elements for electromotive force 15 in each cell 2, so that the temperature of elements for electromotive force 15 is detected. Appropriate counter-measures are arranged to be taken if the elements for electromotive force 15 get above a prescribed temperature.

In this embodiment, the connecting element cooling passages 56 formed above the connecting elements 12 that are mounted within the cover 5 are communicated with the cooling medium passages 21 on both sides. Part of the cooling medium flowing through the cooling medium passages 21 thus flows through the connecting element cooling passages 56, so that the connecting elements 12 are directly cooled from above. Consequently, not only the side faces of cells 2 but also the connecting elements 12 can be effectively cooled, with reduced number of components and assembling steps.

Also, since the environs of the spaces above the elements for electromotive force 15 of cells 2 are cooled by the cooling medium flowing through the connecting element cooling passages 56, no difference is produced between the temperature in these spaces and the temperature of the elements for electromotive force 15. The temperature of the elements for electromotive force 15 can be thus precisely measured by temperature sensors 43.

As will be clear from the above description, with the integrated sealed secondary battery according to the present invention, cooling medium passages are formed between each of the cells and on both sides of the row of the cells, making it possible to achieve forcible cooling of all of the side faces of the cells. Furthermore, the inlet orifice and outlet orifice that supply and discharge cooling medium to and from the cooling medium passages are arranged within recesses formed in the cover such as not to protrude beyond the planar external shape of the cover. There is thus scarcely any risk of their being damaged by accidentally striking an obstruction, and the risk of cooling becoming impossible due to leakage of cooling medium can be eliminated. Furthermore, since the spaces above the elements for electromotive force at each cell are cooled by the cooling medium flowing through the connecting element cooling passages, no temperature gap is produced between the spaces and the elements for electromotive force, so the cell temperatures can be accurately measured by temperature sensors arranged in these spaces, thereby enabling cell life to be improved.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. An integrated sealed secondary battery comprising:
   a plurality of cells, having an outside, arranged in a row respectively accommodating electricity-generating elements,
   said row having two ends,
   each cell having a rectangular tubular case with a bottom end, an upper end, a first side, a second side, a third side and a fourth side;
   cooling jacket members forming first cooling medium passages along the first and second sides of the cells adjacent the cooling jacket members;
   second cooling medium passages formed between the tubular cases on the third side and on the fourth side of respective cells and communicating with the first cooling medium passages;
   said third side and said fourth side of respective cells including bosses; and
   said second cooling medium passages being formed by the bosses being mutually welded to respective opposing ones of the bosses.

2. The integrated sealed secondary battery according to claim 1, further comprising third cooling medium passages formed between the cooling jacket members and the outside of the cells at the two ends of the row.

3. The integrated sealed secondary battery according to claim 1, wherein the cooling jacket members are respectively joined to one of:

the first side and the second side of each respective cell; and the first side and the second side of each respective cell and the two ends of the row.

4. The integrated sealed secondary battery according to claim 1, further comprising flow alignment projecting strips and a cooling medium, wherein said flow-alignment projecting strips are provided in the first cooling medium passages such that the cooling medium flows over the entire surface of the first cooling medium passages on the first side and the second side of the row of the cells.

5. The integrated sealed secondary battery according to claim 1, further comprising an integral cover mutually sealing each of the upper ends of the cells.

6. The integrated sealed secondary battery according to claim 5 wherein the cases and the integral cover of the cells are made of synthetic resin and are integrated by being mutually joined by welding.

7. The integrated sealed secondary battery according to claim 5 wherein the cases of the cells, the integral cover, and the cooling jacket members are made of synthetic resin and are integrated by being mutually joined by welding.

8. The integrated sealed secondary battery according to claim 1, further comprising:
distribution headers provided at the two ends of the row of cells,
an inlet orifice member for supplying cooling medium in one distribution header of said distribution headers at one end of the two ends,
an outlet orifice member for discharging cooling medium in the other distribution header of said distribution headers at the other end of the two ends,
the inlet orifice and the outlet orifice communicating with the first cooling medium passages through the distribution headers.

9. The integrated sealed secondary battery according to claim 1 wherein the second cooling medium passages are formed respectively between adjacent ones of the cells.

10. An integrated sealed secondary battery comprising:
a plurality of cells arranged in a row each cell having a rectangular tubular case including electricity generating elements having a respective bottom end, upper end, a first side, a second side, a third side and a fourth side;
cooling jacket members forming first cooling medium passages along the first side and the second side of the cells adjacent the cooling jacket members;
second cooling medium passages formed between the tubular cases on the third side and on the fourth side of respective cells and communicating with the first cooling medium passages;
said third side and said fourth side of respective cells including bosses;
said second cooling medium passages being formed by the bosses being mutually welded to respective opposing ones of the bosses;
an inlet orifice member and an outlet orifice member for supplying and discharging cooling medium to and from the first cooling medium passages; and
an integral cover for sealing upper ends of the cases of the cells, the integral cover having a planar external surface with recesses with the inlet orifice member and the outlet orifice member mounted therein such as not to protrude beyond the planar external surface of the integral cover.

11. The integrated sealed secondary battery according to claim 10, further comprising a plurality of connection ports, wherein the plurality of connection ports are arranged, respectively, in the inlet orifice member and outlet orifice member in a horizontal direction.

12. The integrated sealed secondary battery according to claim 10, further comprising:
a plurality of connection ports, wherein the inlet orifice and the outlet orifice, respectively, include J-shaped box elements, each J-shaped box element is open at an underside and has an approximately J-shaped planar shape with a long side and a short side,
said connection ports being arranged such as not to protrude from a tip of the short side further than a tip of the long side of the J-shaped box elements, each J-shaped box element being joined to the integral cover,
the integral cover having recesses and connecting apertures, said connecting apertures being at positions on a bottom face of the recesses facing the tip of the long side of the J-shaped box elements and communicating with at least one of the first and second cooling medium passages.

13. The integrated sealed secondary battery according to claim 12 wherein the recesses are formed on one side at both ends of the integral cover, and the long side of the J-shaped box elements is arranged on the outside while its short side is arranged on the inside.

14. An integrated sealed secondary battery comprising:
a plurality of cells arranged in a row respectively having rectangular tubular cases including electricity generating elements each case having a bottom end and upper end, a first side, a second side, a third side and a fourth side;
an integral cover for closing upper ends of the cases of the cells; connecting elements disposed inside of the integral cover for electrically connecting adjacent cells;
cooling jacket members forming first cooling medium passages along the first side and the second side of the cells adjacent the cooling jacket member;
second cooling medium passages formed between the tubular cases on the third side and the fourth side of respective cells and communicating the first cooling medium passages;
said third side and said fourth side of respective cells including bosses;
said second cooling medium passages being formed by the bosses being mutually welded to respective opposing ones of the bosses; and
third cooling medium passages formed above the connecting elements that communicate with the first cooling medium passages.

15. The integrated sealed secondary battery according to clam 14, wherein the cooling jacket members are plate-shaped and the coolingjacket members are joined on both sides of the integrated sealed secondary battery in a direction orthogonal to the direction of arrangement of the cells, the upper ends of the first cooling medium passages are linked to both ends of the third cooling medium passages for cooling the connecting elements.

16. An integrated sealed secondary battery comprising:
a plurality of cells arranged in a row respectively having rectangular tubular cases including electricity generating elements, each cell having a bottom, an upper end, a first side, a second side, a third side and a fourth side;

an integral cover for closing upper ends of the respective cases of the cells having a planar external surface and recesses;

connecting elements disposed inside of the integral cover for electrically connecting adjacent cells;

cooling jacket members forming first cooling medium passages along the first side and the second side of the cells adjacent the cooling jacket members;

second cooling medium passages formed between the tubular cases on the third side and on the fourth side of respective cells and communicating with the first cooling medium passages;

said third side and said fourth side of respective cells including bosses;

said second cooling medium passages being formed by the bosses being mutually welded to respective opposing ones of the bosses;

third cooling medium passages formed above the connecting elements that communicate with the first cooling medium passages; and an inlet orifice member and an outlet orifice member for supplying and discharging cooling medium to and from at least one of the first, second and third cooling medium passages, mounted in recesses formed in the integral cover such as not to protrude beyond the planar external surface of the integral cover.

* * * * *